United States Patent
Bauernfeind et al.

[15] 3,656,060
[45] Apr. 11, 1972

[54] TIME INTERVAL MEASURING AND ACCUMULATING DEVICE

[72] Inventors: Carl J. Bauernfeind; Raymond F. Zeman, both of Rochester, Minn.

[73] Assignee: International Business Machines Corporation, Armonk, N.Y.

[22] Filed: Jan. 15, 1971

[21] Appl. No.: 106,874

Related U.S. Application Data

[63] Continuation of Ser. No. 791,613, Jan. 16, 1969, abandoned.

[52] U.S. Cl. .................................. 324/186, 235/92 T
[51] Int. Cl. .................................................. G04f 9/00
[58] Field of Search ............ 324/186, 187; 235/92 T, 92 TF, 235/92 F

[56] References Cited

OTHER PUBLICATIONS

Hewlett Packard Electronic Test Instruments, Catalog No. 24, pub. 4/63, pp. 120–122

K. R. Cisewski and G. L. Gorsuch, Pulse Timer, IBM Technical Disclosure Bulletin, 8(10), 3/66, pp. 1367–1368

Primary Examiner—Michael J. Lynch
Attorney—Hanifin & Jancin and Robert W. Lahtinen

[57] ABSTRACT

A device for electronically measuring a series of time periods and accumulating all measurements obtained in a visual display for further processing or evaluation. The device can measure the time between leading and trailing edges of a single pulse, the interval between different pulses within a train of pulses or the interval between pulses in one pulse train to pulses in different pulse trains and store the measurements obtained until the maximum capacity for the accumulator for any value or value range is attained. Further the input channels may be controlled to identify the input pulse trains in a variety of predetermined ways according to commonly considered wave forms.

7 Claims, 5 Drawing Figures

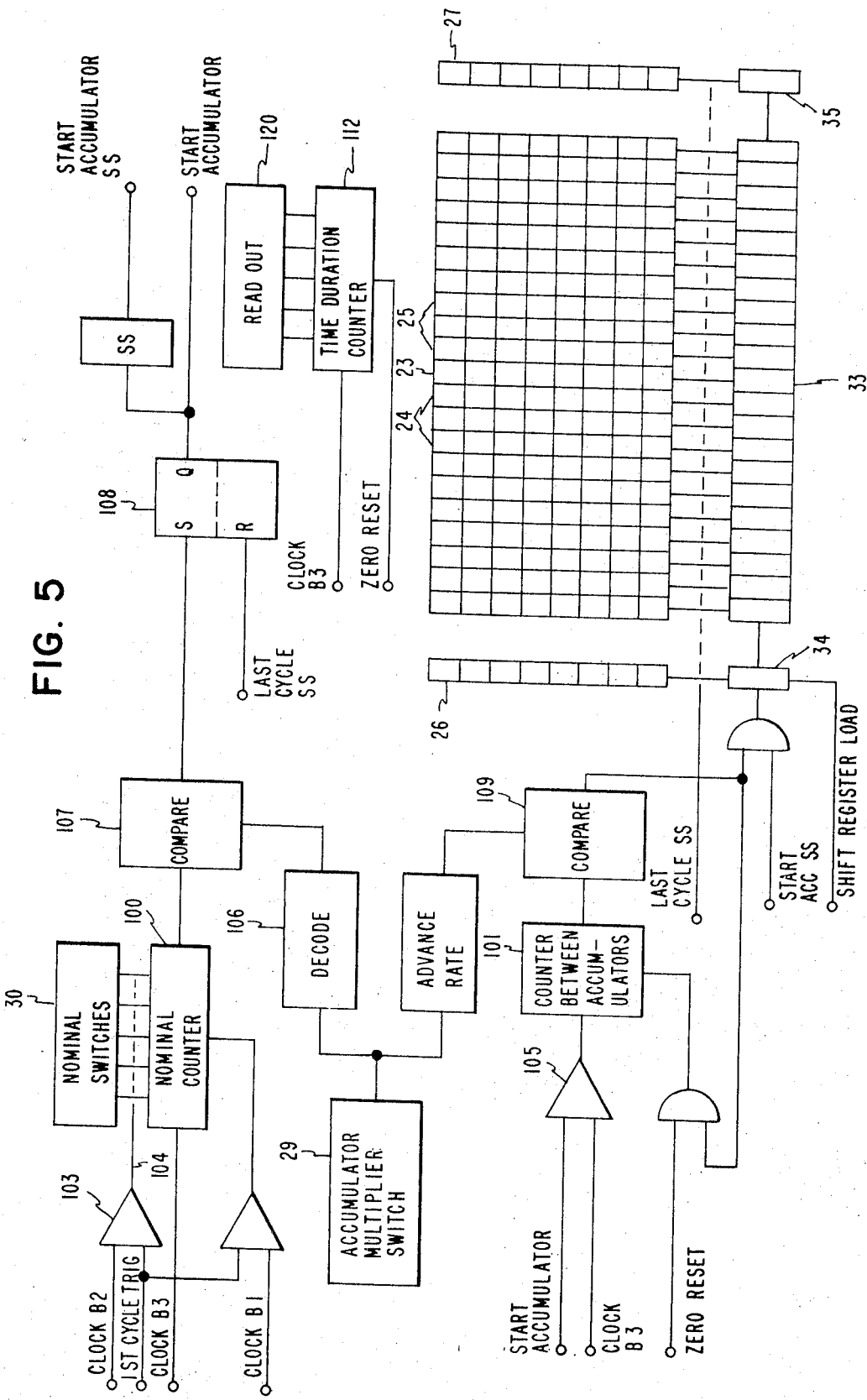

TIME INTERVAL MEASURING AND ACCUMULATING DEVICE

This application is a continuation of application Ser. No. 791,613 filed on Jan. 16, 1969 and now abandoned.

BACKGROUND OF THE INVENTION

The measurement of time intervals associated with a series of events can be accomplished with an electronic counter or an oscilloscope. When the events to be timed are infrequent an electronic counter with a visual display is quite adequate; however, when measurements are to be made of short duration highly repetitive events which occur many times a second it is not possible to observe the display on an electronic counter. If an oscilloscope is utilized it is often possible to establish a trace of repetitive readings similar in nature, but it is difficult to identify the single trace representative of occasional or random irregularities that may be the occurrences of greatest interest to the observer.

SUMMARY OF THE INVENTION

In the real time accumulating device of this invention, time measurements may be made between two selected events either within a single train of pulses or between a selected event associated with a pulse train on one input channel and another selected event associated with a pulse train on a second input channel. Further an external sync may be used to delay the start condition. This sync will latch itself and reset following completion of a measurement and re-sync on the next successive selected event or pulse slope. Accordingly the count may be started on the leading or trailing edge of any pulse from 1 to 99 on either of the input channels following a sync pulse and likewise may be terminated on the appearance of either a leading or trailing edge of any count from 1 to 99 on either of the input channels.

The input channels and associated logic are arranged to permit the input wave forms to be recognized in accordance with the operator's election. When the pulse train occurs between ground and a positive value a pulse definition switch may be set at a plus position to recognize the plus going signal as the leading edge and a negative going signal as the pulse trailing edge. Setting the pulse definition switch at ground causes this definition to be reversed by recognizing the positive value as the datum and identifying the negative going signal as the leading edge and the positive going signal as the trailing edge. When a pulse is observed between ground and a negative value, setting the pulse definition switch at negative identifies the negative going signal as the leading edge and the plus going signal as the trailing edge. Setting the pulse definition switch at ground changes the datum to the negative value causing the plus going signal to be recognized as the leading edge and the negative going value to be recognized as the trailing edge. When the incoming pulse train occurs between positive and negative values, setting the pulse definition switch at plus recognizes only the positive portions of the incoming pulse train and a minus switch setting recognizes only the negative portions of the incoming pulse train. Each of the input channels and the external sync input are similar and independently adjustable.

As each measurement is completed it appears on a time duration readout for visual observation and is entered into an accumulator bank that visually displays all measurements made. The accumulator bank as shown is a series of 23 eight bit binary accumulators which are representative of a sequence of elapsed time values separated by increments established by the operator. The incremental value is the product of the time base and the accumulator multiplier. A nominal accumulator stores the number of measurements at the set value, ten accumulators store values representative of one to ten times the incremental value exceeding the nominal value, ten accumulators store values representative of one to ten times the incremental value below the nominal value while all remaining values beyond this range appear in the high or low accumulators.

An operator can accurately measure pulse durations or events identified by pulse portions in a single pulse train or a different pulse train and store a rapidly occurring sequence of such measurements. These accumulated results can be used for such functions as machine tolerance setting and checking.

BRIEF DESCRIPTION OF THE DRAWINGS

FIG. 5 illustrates logic circuitry associated with the counters, advance rate control and accumulators.

DETAILED DESCRIPTION

Figure 1:
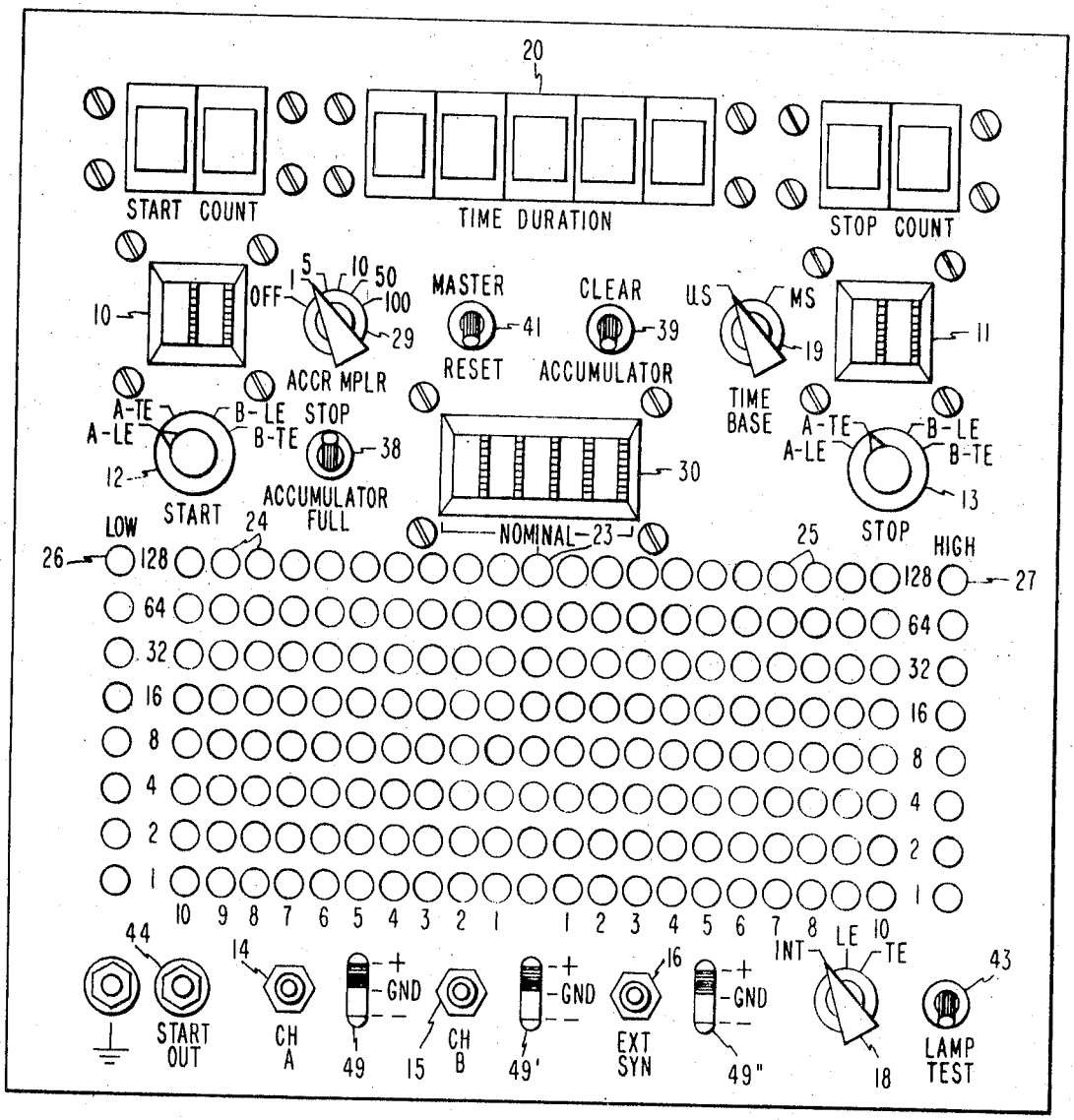
FIG. 1 is a front elevation of the device of this invention showing the connectors, control and display elements.

Referring to FIG. 1 the operating controls and displays appear on the front panel of the device. To operate the device the number of start pulse and stop pulse are selected by means of thumb wheel switches 10 and 11 respectively. The start and stop conditions are selected and set on the switches 12 and 13. The measurement may be begun with respect to the leading edge or trailing edge of a pulse on either channel A input 14 or channel B input 15 by adjusting switch 12. In like manner termination can occur by sensing the leading or trailing edge of the selected stop pulse on either A or B channels as selected using switch 13. Each of the input channels 14 and 15 is fed into a high impedance amplifier so that operations of the device being tested are not affected while measurements are being made. Also available is an external sync channel 16 which will delay the start condition until a sync pulse is received and will re-sync on the first selected pulse condition following completion of a measurement. The sync switch 18 selects the pulse slope detection when the external sync is used and is set at internal when A or B channel pulses are used for the sync. A time base switch 19 is selected to determine whether the measurement is to be effected in microseconds or milliseconds. This is effected by a determination as to which of two oscillators feeds the input of the timing circuit.

The input channels and the input switches in association with the accompanying logic functions of the device permit definition of the pulse in the normally accepted manner. A pulse occurring in the positive region either between a positive value and ground with the input switch set at the plus position is recognized with plus going portion as the leading edge and the negative going portion as the trailing edge. By setting the input switch at ground the conditions are reversed, the pulse negative going portion is recognized as the leading edge and the plus going portion as the trailing edge. When a pulse from ground to a negative value is to be observed, setting the input switch at minus recognizes a negative going signal as the pulse leading edge and a plus going signal as the trailing edge. Setting the input switch at ground reverses this condition, recognizing the positive going portion of the pulse as the leading edge and the negative going portion as the trailing edge. When a pulse is being observed which swings between a plus voltage value and a minus voltage value, setting the input switch at plus recognizes the signal portions having above ground potential while setting the input switches in a minus mode recognizes the signal portions having a below ground potential.

The elapsed time of a measurement is recorded by the time duration counter 112 and each value measured appears successively on the five digit decimal display 20. For purposes of entering the accumulator bank a nominal value is entered into the nominal value switches 30 by setting the thumb wheel switch adjustable digits of the five digit nominal switch assembly which establishes the elapsed time value represented by the nominal accumulator 23. The accumulator bank includes 23 binary accumulators with a nominal value accumulator 23, ten below nominal accumulators 24, ten above nominal accumulators 25, a low accumulator 26 and a high accumulator 27. The accumulator bank displays the accumulated readings by lighting incandescent lamps to give a visible binary display of all readings with a further provision available for stopping a sequence of readings when any one of the accumulators are filled. The accumulator bank functions in conjunction with the shift register which has 23 positions one corresponding to each of the 23 individual binary accumulators in the accumulator bank. A bit is initially loaded in the shift register in the low position and thereafter at a value of the nominal reduced by an amount equivalent to ten times the product of the time base and multiplier value begins to increment from position within the shift register (indicating each interval in microseconds or milliseconds in accordance with the established time base and multiplier switch) unless the final or high bit position (all values in excess of an amount equivalent to the nominal value plus ten times the product of multiplier and time base) is attained wherein the bit remains. At the end of the measurement the bit is shifted into the corresponding accumulator to increase the count in that accumulator by one thereby recording the measurement.

Thus if the nominal value is 50, the time base is microseconds and the multiplier is one, any measurement of 39 microseconds or less will be entered in a low accumulator, a measurement of 43 microseconds would be entered in the 7 below nominal accumulator, an elapsed time of 50 microseconds would appear in the nominal accumulator, a time measurement of 60 microseconds would appear in the ten above nominal accumulator and all elapsed time measured values of 61 microseconds or greater would appear in the high accumulator.

Other controls which are operator actuable include switch 38 which has three positions, one for stopping operation when any accumulator is full as previously referred to, a non-stop position where measurements are made continuously irrespective of the number entered in any individual accumulator and an immediate stop position that terminates operation upon actuation. Switch 39 is used to reset all accumulators and is the only means by which the operator can zero all accumulator counters. The master reset switch 41 resets all logic functions in the timing circuitry and a lamp test switch 43 is provided for simultaneously energizing all accumulator lamps to enable a determination of lamp conditions to be visually made. The start output socket 44 yields a positive going signal when a start condition occurs.

Figure 2:
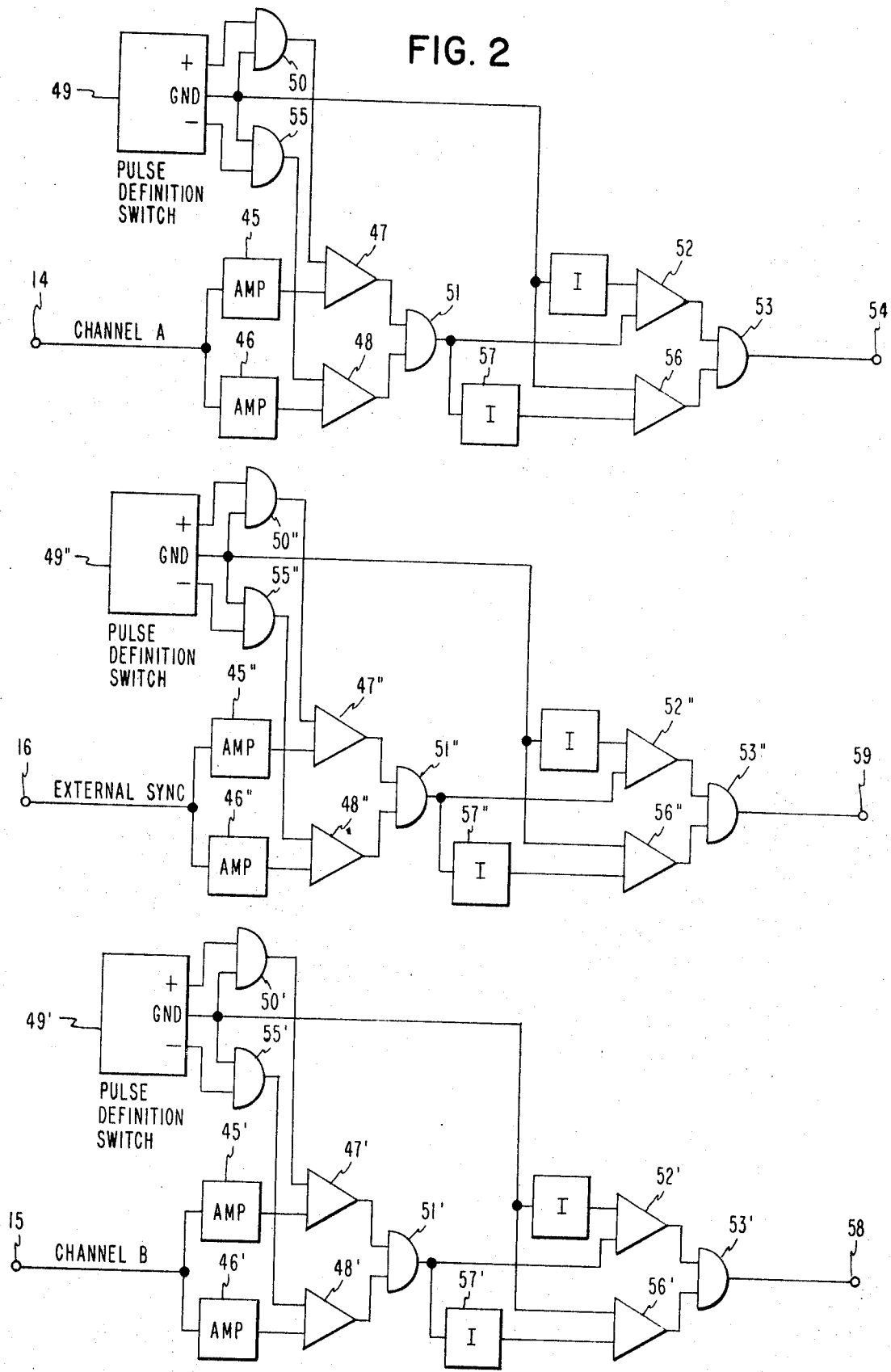
FIG. 2 shows the logic circuitry associated with the input channels of the device of FIG. 1.

With reference to FIG. 2, connecting an input to channel A input 14 delivers the incoming signal to amplifier 45 which recognizes positive signals and amplifier 46 which recognizes negative signals. Amplifiers 45 and 46 which are of high impedance to avoid interference with the operation of the device being tested, supply the outputs thereof to AND blocks 47 and 48 respectively. The pulse definition switch 49 associated with channel A input 14 may be set at plus, minus or ground. With switch 49 set at the plus position, OR block 50 supplies a logical 1 output to AND block 47 causing positive signals to be supplied through OR block 51 to AND block 52 where a logical zero signal from switch 49 ground position is inverted and ANDed to deliver the position signal through OR block 53 to terminal 54. Similarly with pulse definition switch 49 set at minus the logical 1 output of OR block 55 is supplied to AND block 48 with the output thereof supplied through OR block 51 to AND block 52 which transmits a signal representative of a negative input through OR block 53 to terminal 54. With switch 49 set at ground a logical one is supplied to AND block 56 and OR blocks 50 and 55 supply inputs to AND block 47 and 48 respectively. Thereupon inverter 57 causes the inverted outputs of both amplifiers 45 and 46 to be transmitted through AND block 56 and OR block 53 to terminal 54.

In like manner adjusting pulse definition switch 49' controls the input supplied at channel B input 15 through amplifiers 45' and 46' to terminal 58 and switch 49'' controls the external sync input 16 supplied through amplifiers 56'' and 46'' to terminal 59.

Figure 3:
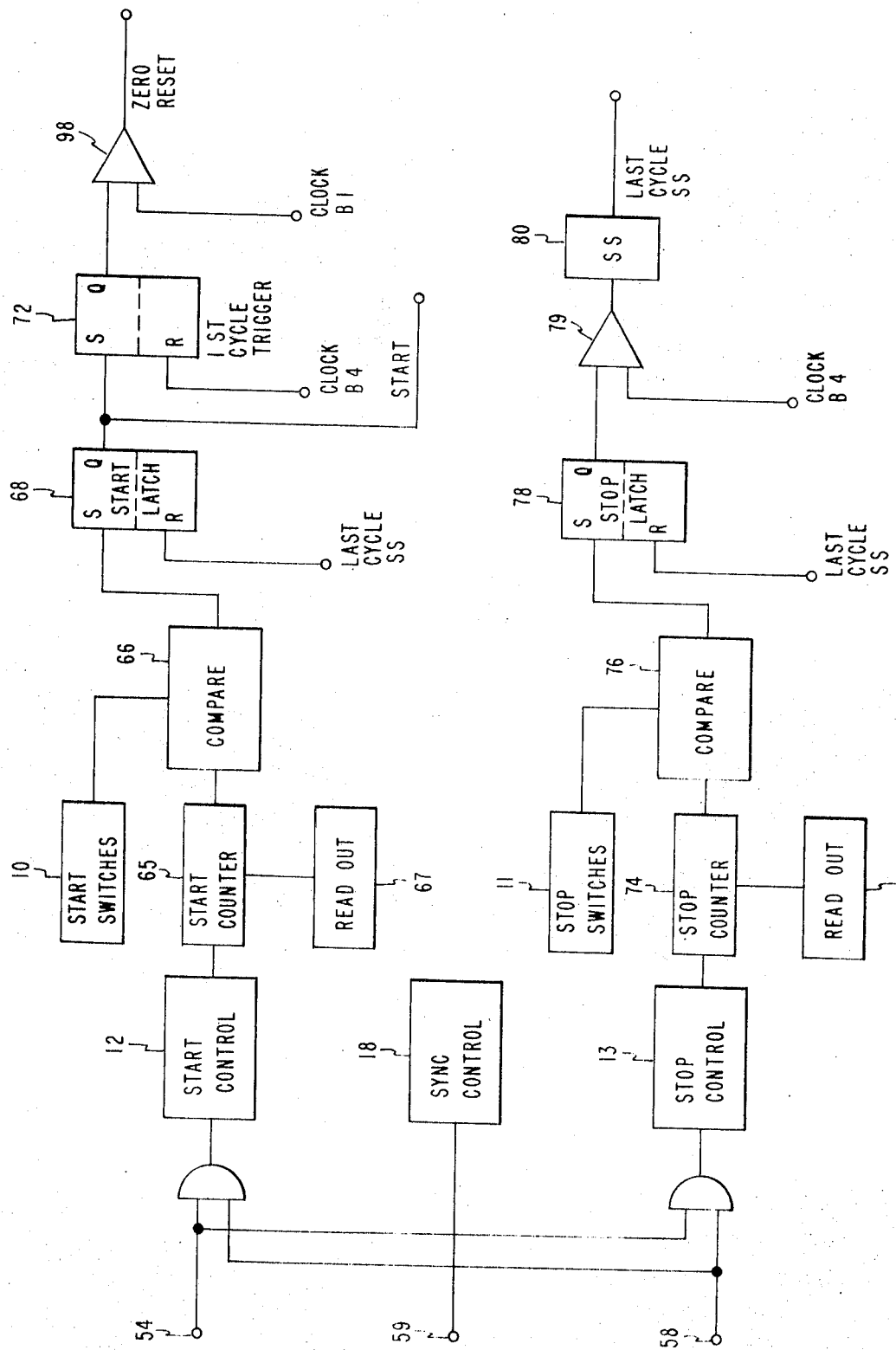
FIG. 3 illustrates the logic circuits for the starting and stopping of measurements.

Referring to FIG. 3 when the start and stop conditions have been established and a corresponding setting made as to channels and leading or trailing edges on switches 12 an 13, pulse number on switches 10 and 11, and when an external sync is called for the desired slope set on switch 18; the sync will initiate operation of the start count and stop count.

The output of the start counter 65 appears on readout display 67 and is compared with the pulse number setting on the start switches 10 through compare circuit 66. Upon coincidence the output sets start latch 68. The output of latch 68 sets first cycle trigger 72.

The output of the stop counter 74 is displayed on readout 75 and compared at 76 with the setting on the stop switches 11. Indication of a coincidence generates an output which sets the stop latch 78 that in turn has an output which is ANDed at 79 with a pulse from the clock timer (described hereafter) to fire a single shot 80 which resets both start latch 68, stop latch 78 and performs a number of other functions hereinafter described which relate to the termination of the measurement cycle.

Figure 4:
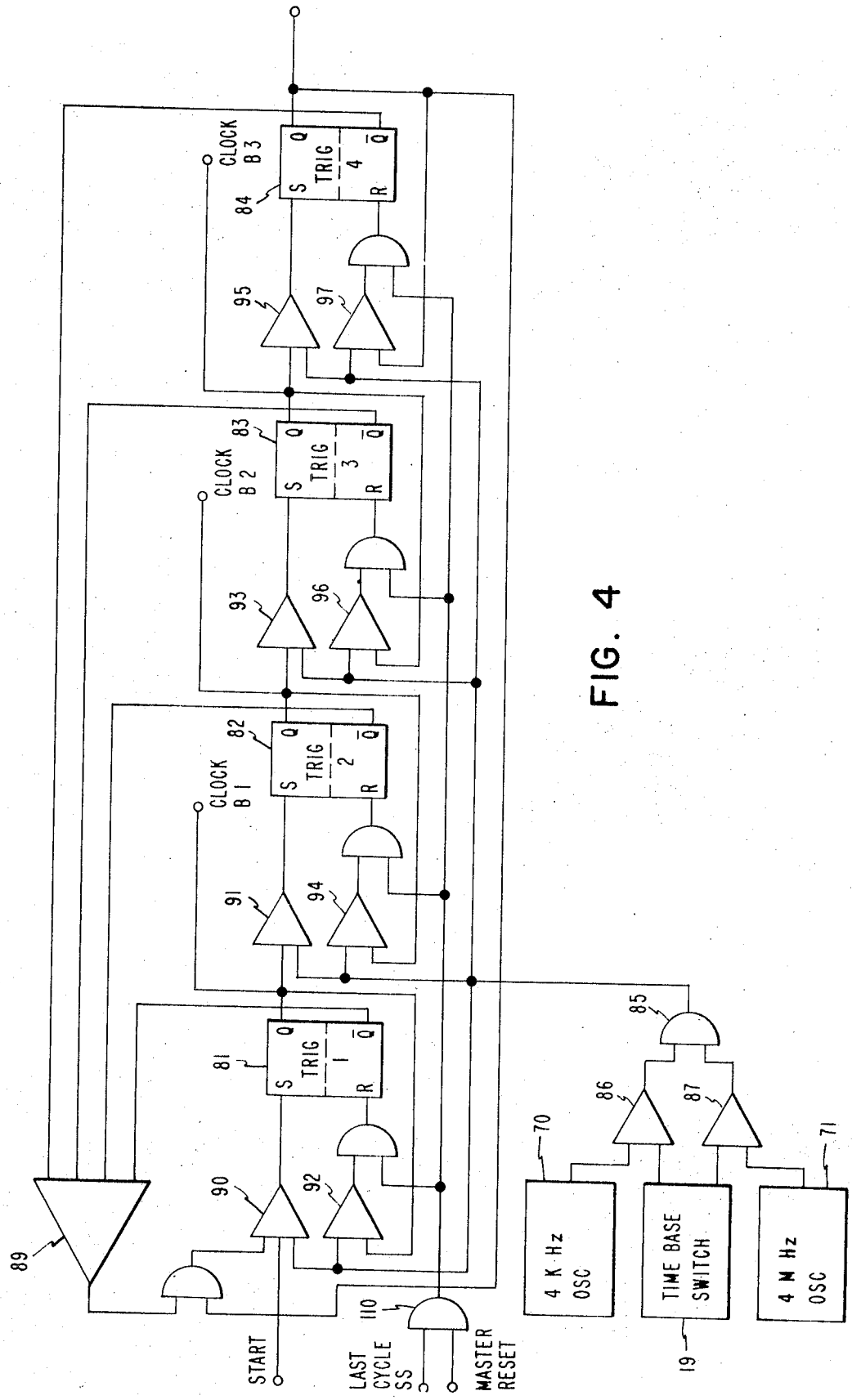
FIG. 4 shows the trigger ring counter and oscillator circuitry.

Referring to FIG. 4 the measurement of the elapsed time is accomplished by a trigger ring counter including four principal triggers 81, 82, 83 and 84. The count is initiated through AND block 90 by the coincidence of outputs of OR block 85 which is responsive to the output of either of the AND blocks 86 or 87 to which the logical output of the time base switch 19 is connected, the start latch 68 (FIG. 3) and the AND block 89 which has an output when all of the triggers 81 through 84 are in a reset condition. A portion of the output of trigger 81 is identified as clock B1 time, while the output is also directed to AND blocks 91 and 92 to enable the next successive oscillator pulse to reset trigger 81 and set trigger 82 respectively. In like manner the output of trigger 82 generates a clock B2 time signal while supplying a signal to AND block 93 and 94 to reset trigger 82 and set trigger 83 when the next oscillator pulse occurs and the output of trigger 83 generates the clock B3 time signal while being connected to AND block 95 and 96 to reset the trigger 83 and set trigger 84 when the succeeding oscillator pulse occurs. The output of trigger 84 generates the clock B4 time output and reset trigger 84 through AND block 97 when the next oscillator pulse occurs. In addition trigger 84 output is directed to AND block 90 to recycle the trigger ring on the next oscillator cycle if the start trigger input to AND block 90 is still active. Accordingly one cycle through the trigger ring represents 1 microsecond or one millisecond depending upon whether the 4 megahertz oscillator 71 or the 4 kilohertz oscillator 70 is selected by the time base switch 19. The count is stopped by terminating the start latch input to AND block 90 to prevent the setting of trigger 81 at the next occurrence of clock B4 time.

During the first cycle of the trigger ring the output of trigger 81 at clock B1 time is ANDed with the output from the first cycle trigger 72 at 98 to initiate the zero reset signal which resets the nominal counter 100 and the counter 101 which counts the microsecond or millisecond time units between accumulators. The clock B2 time output from trigger 82 is ANDed with the output of the first cycle trigger 72 at 103 with the output 104 thereof loading the nominal counter 100 and loading a bit into the low position 34 of the shift register 33. Clock B3 time at the output of trigger 83 serves during the initial cycle and every cycle thereafter to advance the nominal counter 100, time duration counter 112 and deliver an input signal to AND block 105 which controls counter 101 between accumulators. During the first cycle of the trigger ring the clock B4 time output from trigger 84 resets the first cycle trigger 72 and during every cycle B4 time output is transmitted to AND block 90.

Accumulator multiplier switch 29 is set to the desired multiple of microseconds or milliseconds prior to operation. Switch 29 communicates with decode circuit 106 which determines a value equivalent to a nominal value set by switches 30 less ten times the value entered on multiplier switch 29. This value is received by compare circuit 107 where, upon coincidence, an output sets latch 108. Latch 108 being active supplies an input to AND block 105 whereupon each B3 time pulse thereafter advances counter 101 between accumulators. Switch 29 also delivers the advance rate compare circuit 109 which has an output that advances the bit in the shift register 33 one position to the right as viewed in FIG. 5 and resets counter 101.

When a coincidence occurs at the stop compare 76 (FIG. 3) causing an output to be transmitted through stop latch 78 to AND block 79 the next output at clock B4 time will fire the last cycle single shot 80. As previously indicated the last cycle single shot resets start latch 68 and stop latch 78. Reset of latch 68 terminates the start signal to AND block 90 causing the trigger ring counter to be interrupted as clock output B4 fails to set trigger 81. Further the last cycle single shot 80 resets latch 108, adds the bit from the shift register 33 into the binary accumulator 23 through 27 which corresponds to the value of the current shift register position; and issues an input to OR block 110 which serves to assure that each of the triggers 81 through 84 of the trigger ring counter is reset.

Following the output of the last cycle single shot 80 the measurement is terminated and entered into the accumulator bank and the external sync is prepared to initiate the next successive measurement. The elapsed time measured on the counter 112 is displayed digitally on the five position readout 20 until the next subsequent zero pulse resets the counter 100 for the next subsequent measurement.

What is claimed is:

1. A time interval measuring device for measuring time relationships associated with electrical pulses and accumulating a series of such measured values comprising:
   start means for initiating a timing period;
   stop means for terminating a time period;
   timing means for measuring the elapsed time intermediate actuation of said start means and said stop means;
   a shift register having a sequence of positions corresponding to increasing values of elapsed time measured by said timing means and separated by predetermined increments;
   manually operable means for setting a nominal value of time interval measurement;
   means for loading a bit into the first of said sequence of positions following initiation of a timing cycle when the measured time interval is equivalent to the value represented by said first of said sequence of positions;
   accumulating means for sequentially storing and simultaneously displaying the values of a plurality of serial measurements established by said timing means,
   said accumulating means including a plurality of accumulators respectively corresponding to the positions in said shift register;
   means for advancing said bit through successive positions of said shift register in response to measurements by said timing means of said predetermined increments of time corresponding to the value between successive positions of said shift register; and
   means for entering said bit into the accumulator corresponding to the shift register position in which said bit is disposed upon termination of said timing period.

2. The time interval measuring device of claim 1 further comprising:
   initial and final positions in said shift register in which said bit is disposed during any time period being measured by said timing means respectively prior to or subsequent to said sequence of values represented by said sequence of positions in said shift register; and
   said plurality of accumulators includes accumulators corresponding respectively to said initial and final positions.

3. The time interval measuring device of claim 2 further comprising means for selectively setting the time increment between successive positions of said shift register.

4. The time interval measuring device of claim 2 further comprising means for loading said bit in said shift register initial position during the first unit of time measurement effected by said timing means.

5. The time interval measuring device of claim 2 wherein said accumulators present a visible display of the values of all measurements of a sequence showing elapsed time values corresponding to said shift register positions.

6. The time interval measuring device of claim 1 further comprising:
   input channel means for receiving an input signal and conveying such signal to said start means and stop means; and
   input channel control means settable to first, second, and third operating conditions; said control means in said first operating condition recognizing input signals varying between ground and above ground potential wherein a positive going signal is identified as a pulse leading edge and a negative going signal as a pulse trailing edge, in said second operating position recognizing input signals varying between ground and below ground potential with minus going signals identified as a pulse leading edge and negative going signals identified as a pulse trailing edge, and said third operating condition recognizing signals of both positive and negative potential with potential changes approaching ground potential identified as pulse leading edges and potential changes away from ground potential identified as pulse trailing edges.

7. The time inverval measuring device of claim 1 wherein said nominal value of time interval measurement is assigned to the median of said shift register positions.

* * * * *